(12) United States Patent
Woo (10) Patent No.: US 9,676,532 B2
(45) Date of Patent: Jun. 13, 2017

(54) PACKAGING RECLOSURE LABEL FOR HIGH ALCOHOL CONTENT PRODUCTS

(71) Applicant: Avery Dennison Corporation, Pasadena, CA (US)

(72) Inventor: Julia Woo, Junshan (CN)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/965,424

(22) Filed: Aug. 13, 2013

(65) Prior Publication Data

US 2014/0048438 A1    Feb. 20, 2014

(51) Int. Cl.
*B65D 41/00* (2006.01)
*B65D 53/08* (2006.01)
(Continued)

(52) U.S. Cl.
CPC ............... *B65D 53/08* (2013.01); *B32B 1/02* (2013.01); *B32B 7/12* (2013.01); *B32B 27/08* (2013.01);
(Continued)

(58) Field of Classification Search
CPC .... B65D 17/502; B65D 17/505; B65D 53/08; B65D 2517/0013; B65D 2517/5083; B65D 2575/586; B29C 66/534
See application file for complete search history.

(56) References Cited

U.S. PATENT DOCUMENTS 3,113,986 A    12/1963   Breslow et al.
3,207,735 A     9/1965   Wijga
(Continued)

FOREIGN PATENT DOCUMENTS

CN    1086488    5/1994
CN    1659030    8/2005
(Continued)

OTHER PUBLICATIONS

International Preliminary Report on Patentability issued in corresponding IA No. PC/CN0212/080154 dated Feb. 17, 2015.
(Continued)

*Primary Examiner* — Anthony Stashick
*Assistant Examiner* — James Way
(74) *Attorney, Agent, or Firm* — Avery Dennison Corporation (57) ABSTRACT

The present subject matter provides a layered article for sealing an opening in a package for a high alcohol content product. The layered article has a facestock, a reclosure adhesive, a machine direction oriented film, and a sealing adhesive. The sealing adhesive provides a good long-term seal for the package that is resistant to degradation from alcohol. The machine direction oriented film provides an alcohol barrier between the product and the reclosure adhesive. Upon opening, the film tears clean and straight in the machine direction to allow a portion of the film to stay in contact with the package and another portion of the film to be pulled from the package to expose the opening. The reclosure adhesive provides resealing capabilities for the layered article after the initial opening of the package. The clean straight tear also provides a tamper evident feature for the package.

41 Claims, 4 Drawing Sheets

(51) Int. Cl.
  *B65D 75/58* (2006.01)
  *B32B 7/12* (2006.01)
  *B32B 27/08* (2006.01)
  *B32B 27/30* (2006.01)
  *B32B 27/32* (2006.01)
  *B32B 27/36* (2006.01)
  *B32B 1/02* (2006.01)
  *B65D 17/50* (2006.01)

(52) U.S. Cl.
  CPC ............ *B32B 27/304* (2013.01); *B32B 27/32* (2013.01); *B32B 27/36* (2013.01); *B65D 75/5838* (2013.01); *B32B 2307/412* (2013.01); *B32B 2307/414* (2013.01); *B32B 2439/00* (2013.01); *B65D 17/502* (2013.01); *B65D 2517/5083* (2013.01); *B65D 2575/586* (2013.01); *Y10T 428/1452* (2015.01); *Y10T 428/1476* (2015.01); *Y10T 428/1481* (2015.01)

(56) References Cited

U.S. PATENT DOCUMENTS

| | | |
|---|---|---|
| 3,207,736 A | 9/1965 | Wijga |
| 3,207,737 A | 9/1965 | Wales |
| 3,207,738 A | 9/1965 | Wijga |
| 3,207,739 A | 9/1965 | Wales |
| 3,251,905 A | 5/1966 | Zelinski et al. |
| 3,268,627 A | 8/1966 | Emrick |
| 3,390,207 A | 6/1968 | Moss et al. |
| 3,598,887 A | 8/1971 | Darcy et al. |
| 3,639,521 A | 2/1972 | Hsieh |
| 3,853,595 A | 12/1974 | Pedginski |
| 3,887,745 A | 6/1975 | Yoshii |
| 3,894,904 A | 7/1975 | Cook |
| 3,963,851 A | 6/1976 | Toyoda |
| 4,016,118 A | 4/1977 | Hamada et al. |
| 4,020,141 A | 4/1977 | Quinn et al. |
| 4,059,667 A | 11/1977 | Pangonis |
| 4,124,677 A | 11/1978 | Saijo et al. |
| 4,188,350 A | 2/1980 | Vicik et al. |
| 4,205,021 A | 5/1980 | Morita et al. |
| 4,207,363 A | 6/1980 | Lustig et al. |
| 4,208,356 A | 6/1980 | Fukawa et al. |
| 4,219,627 A | 8/1980 | Halasa et al. |
| 4,226,952 A | 10/1980 | Halasa et al. |
| 4,314,039 A | 2/1982 | Kawai et al. |
| 4,340,640 A | 7/1982 | Weiner |
| 4,371,645 A | 2/1983 | Mahaffey, Jr. |
| 4,399,180 A | 8/1983 | Briggs et al. |
| 4,399,181 A | 8/1983 | Yoshimura et al. |
| 4,405,667 A | 9/1983 | Christensen et al. |
| 4,407,873 A | 10/1983 | Christensen et al. |
| 4,407,874 A | 10/1983 | Gehrke |
| 4,430,377 A | 2/1984 | Yoshimura et al. |
| 4,434,264 A | 2/1984 | Ficker |
| 4,447,485 A | 5/1984 | Aritake |
| 4,451,533 A | 5/1984 | Wong |
| 4,463,113 A | 7/1984 | Nakahara et al. |
| 4,508,872 A | 4/1985 | McCollough, Jr. |
| 4,514,534 A | 4/1985 | DiNardo |
| 4,522,887 A | 6/1985 | Koebisu et al. |
| 4,525,416 A | 6/1985 | Hammerschmidt |
| 4,532,280 A | 7/1985 | Kobayashi et al. |
| 4,535,125 A | 8/1985 | McCullough, Jr. |
| 4,551,380 A | 11/1985 | Schoenberg |
| 4,564,559 A | 1/1986 | Wagner, Jr. et al. |
| 4,565,738 A | 1/1986 | Purdy |
| 4,578,316 A | 3/1986 | Clauson et al. |
| 4,578,429 A | 3/1986 | Gergen et al. |
| 4,581,262 A | 4/1986 | Karabedian |
| 4,585,679 A | 4/1986 | Karabedian |
| 4,588,775 A | 5/1986 | McCullough, Jr. |
| 4,604,324 A | 8/1986 | Nahmias et al. |
| 4,605,576 A | 8/1986 | Jabarin |
| 4,613,547 A | 9/1986 | Wagner, Jr. et al. |
| 4,613,643 A | 9/1986 | Nakamura et al. |
| 4,616,470 A * | 10/1986 | Nakamura ................ 53/412 |
| 4,621,119 A | 11/1986 | Lu |
| 4,626,574 A | 12/1986 | Cancio et al. |
| 4,634,735 A | 1/1987 | Thiersault et al. |
| 4,643,945 A | 2/1987 | Kiang |
| 4,657,970 A | 4/1987 | Shiraki et al. |
| 4,659,612 A | 4/1987 | Balloni et al. |
| 4,663,216 A | 5/1987 | Toyoda et al. |
| 4,684,578 A | 8/1987 | Inoue et al. |
| 4,692,489 A | 9/1987 | Ficker et al. |
| 4,695,503 A | 9/1987 | Liu et al. |
| 4,704,421 A | 11/1987 | Teskin |
| 4,713,273 A | 12/1987 | Freedman |
| 4,716,068 A | 12/1987 | Seifried |
| 4,720,427 A | 1/1988 | Clauson et al. |
| 4,724,185 A | 2/1988 | Shah |
| 4,728,377 A | 3/1988 | Gallagher |
| 4,735,335 A * | 4/1988 | Torterotot ................ 220/270 |
| 4,748,206 A | 5/1988 | Nogiwa et al. |
| 4,752,597 A | 6/1988 | Turner |
| 4,769,284 A | 9/1988 | Kakugo et al. |
| 4,778,697 A | 10/1988 | Genske et al. |
| 4,790,436 A | 12/1988 | Nakamura |
| 4,795,782 A | 1/1989 | Lutz et al. |
| 4,797,235 A | 1/1989 | Garland et al. |
| 4,798,081 A | 1/1989 | Hazlitt et al. |
| 4,808,561 A | 2/1989 | Welborn, Jr. |
| 4,833,024 A | 5/1989 | Mueller |
| 4,843,129 A | 6/1989 | Spenadel et al. |
| 4,855,187 A | 8/1989 | Osgood, Jr. et al. |
| 4,865,908 A | 9/1989 | Liu et al. |
| 4,880,422 A | 11/1989 | McBride |
| 4,906,315 A | 3/1990 | McGrew |
| 4,913,858 A | 4/1990 | Miekka et al. |
| 4,933,120 A | 6/1990 | D'Amato et al. |
| 4,937,299 A | 6/1990 | Ewen et al. |
| 4,956,232 A | 9/1990 | Balloni et al. |
| 4,957,790 A | 9/1990 | Warren |
| 4,966,795 A | 10/1990 | Genske et al. |
| 4,988,465 A | 1/1991 | Lustig et al. |
| 5,003,915 A | 4/1991 | D'Amato et al. |
| 5,026,592 A | 6/1991 | Janocha et al. |
| 5,026,778 A | 6/1991 | Fujii et al. |
| 5,028,480 A | 7/1991 | Dean |
| 5,049,436 A | 9/1991 | Morgan et al. |
| 5,049,605 A | 9/1991 | Rekers |
| 5,068,155 A | 11/1991 | Yamada et al. |
| 5,077,129 A | 12/1991 | Schinkel |
| 5,083,850 A | 1/1992 | Mallik et al. |
| 5,084,558 A | 1/1992 | Rausch et al. |
| 5,085,816 A | 2/1992 | McCord |
| 5,089,352 A | 2/1992 | Garland et al. |
| 5,100,728 A | 3/1992 | Plamthottam et al. |
| 5,110,671 A | 5/1992 | Balloni |
| 5,116,548 A | 5/1992 | Mallik et al. |
| 5,125,529 A * | 6/1992 | Torterotot ............ B65D 77/206 215/232 |
| 5,145,212 A | 9/1992 | Mallik |
| 5,151,309 A | 9/1992 | Dollinger |
| 5,164,227 A | 11/1992 | Miekka et al. |
| 5,164,444 A | 11/1992 | Bernard |
| 5,175,054 A | 12/1992 | Chu |
| 5,186,782 A | 2/1993 | Freedman |
| 5,190,609 A | 3/1993 | Lin et al. |
| 5,194,324 A | 3/1993 | Poirier |
| 5,206,075 A | 4/1993 | Hodgson, Jr. |
| 5,212,246 A | 5/1993 | Ogale |
| 5,213,744 A | 5/1993 | Bossaert |
| 5,217,812 A | 6/1993 | Lee |
| 5,242,650 A | 9/1993 | Rackovan et al. |
| 5,250,631 A | 10/1993 | McCullough, Jr. |
| 5,252,384 A | 10/1993 | Bothe et al. |
| 5,254,393 A | 10/1993 | Murschall et al. |
| 5,254,394 A | 10/1993 | Bothe et al. |
| 5,272,236 A | 12/1993 | Lai et al. |
| 5,275,886 A | 1/1994 | Chu et al. |
| 5,278,272 A | 1/1994 | Lai et al. |

(56) References Cited

U.S. PATENT DOCUMENTS

| | | |
|---|---|---|
| 5,286,552 A | 2/1994 | Lesca et al. |
| 5,286,564 A | 2/1994 | Cecchin et al. |
| 5,288,548 A | 2/1994 | Weber |
| 5,292,561 A | 3/1994 | Peiffer et al. |
| 5,298,561 A | 3/1994 | Cecchin et al. |
| 5,300,365 A | 4/1994 | Ogale |
| 5,316,777 A | 5/1994 | Toyoda et al. |
| 5,326,639 A | 7/1994 | Leonard et al. |
| 5,331,047 A | 7/1994 | Giacobbe |
| 5,332,542 A | 7/1994 | Yamanaka et al. |
| 5,342,868 A | 8/1994 | Kimura et al. |
| 5,358,792 A | 10/1994 | Mehta et al. |
| 5,360,868 A | 11/1994 | Mosier et al. |
| 5,362,782 A | 11/1994 | McCullough, Jr. et al. |
| 5,376,417 A | 12/1994 | Amano et al. |
| 5,380,572 A | 1/1995 | Kotani et al. |
| 5,380,810 A | 1/1995 | Lai et al. |
| 5,382,631 A | 1/1995 | Stehling et al. |
| 5,395,471 A | 3/1995 | Obijeski et al. |
| 5,407,732 A | 4/1995 | Dokurno |
| 5,409,992 A | 4/1995 | Eppert, Jr. |
| 5,414,040 A | 5/1995 | McKay et al. |
| 5,424,362 A | 6/1995 | Hwang et al. |
| 5,425,990 A | 6/1995 | Blum |
| 5,427,807 A | 6/1995 | Chum et al. |
| 5,435,963 A | 7/1995 | Rackovan et al. |
| 5,451,283 A | 9/1995 | Josephy et al. |
| 5,451,455 A | 9/1995 | Peiffer et al. |
| 5,453,466 A | 9/1995 | Pellegatti et al. |
| 5,462,809 A | 10/1995 | Berkowitz |
| 5,464,690 A | 11/1995 | Boswell |
| 5,468,440 A | 11/1995 | McAlpin et al. |
| 5,468,535 A | 11/1995 | Amano et al. |
| 5,474,820 A | 12/1995 | Murschall et al. |
| 5,475,075 A | 12/1995 | Brant et al. |
| 5,476,914 A | 12/1995 | Ewen et al. |
| 5,482,766 A | 1/1996 | Mathavan et al. |
| 5,482,780 A | 1/1996 | Wilkie et al. |
| 5,491,019 A | 2/1996 | Kuo |
| 5,492,757 A | 2/1996 | Schuhmann et al. |
| 5,496,600 A | 3/1996 | Peiffer et al. |
| 5,501,905 A | 3/1996 | Krallmann |
| 5,503,923 A | 4/1996 | Goto et al. |
| 5,508,090 A | 4/1996 | Peiffer et al. |
| 5,516,563 A | 5/1996 | Schumann et al. |
| 5,525,695 A | 6/1996 | Lai et al. |
| 5,527,601 A | 6/1996 | Crighton |
| 5,529,843 A | 6/1996 | Dries et al. |
| 5,530,054 A | 6/1996 | Tse et al. |
| 5,530,055 A | 6/1996 | Needham |
| 5,552,482 A | 9/1996 | Berta |
| 5,560,563 A | 10/1996 | Jenson, Jr. et al. |
| 5,560,885 A | 10/1996 | Murschall et al. |
| 5,560,997 A | 10/1996 | Kotani |
| 5,562,958 A | 10/1996 | Walton et al. |
| 5,573,723 A | 11/1996 | Peiffer et al. |
| 5,582,889 A | 12/1996 | Pedrini |
| 5,582,923 A | 12/1996 | Kale et al. |
| 5,585,193 A | 12/1996 | Josephy et al. |
| 5,591,390 A | 1/1997 | Walton et al. |
| 5,594,070 A | 1/1997 | Jacoby et al. |
| 5,595,705 A | 1/1997 | Walton et al. |
| 5,611,980 A | 3/1997 | Eto et al. |
| 5,611,982 A | 3/1997 | Hathavan et al. |
| 5,639,811 A | 6/1997 | Plamthottam et al. |
| 5,641,848 A | 6/1997 | Giacobbe et al. |
| 5,643,678 A | 7/1997 | Boswell |
| 5,662,985 A | 9/1997 | Jensen et al. |
| 5,665,800 A | 9/1997 | Lai et al. |
| 5,670,003 A | 9/1997 | Boswell |
| 5,672,224 A | 9/1997 | Kaufmann |
| 5,674,342 A | 10/1997 | Obijeski et al. |
| 5,674,580 A | 10/1997 | Boswell |
| 5,674,630 A | 10/1997 | Chatterjee |
| 5,677,383 A | 10/1997 | Chum et al. |
| 5,685,128 A | 11/1997 | Chum et al. |
| 5,691,043 A | 11/1997 | Keller et al. |
| 5,709,937 A | 1/1998 | Adams et al. |
| 5,711,839 A | 1/1998 | Dronzek et al. |
| 5,712,031 A | 1/1998 | Kelch et al. |
| 5,716,669 A | 2/1998 | LaRose et al. |
| 5,747,192 A | 5/1998 | Hughen et al. |
| 5,747,594 A | 5/1998 | deGroot et al. |
| 5,753,349 A | 5/1998 | Boswell |
| 5,756,169 A | 5/1998 | Peiffer et al. |
| 5,759,648 A | 6/1998 | Idias |
| 5,759,683 A | 6/1998 | Boswell |
| 5,773,155 A | 6/1998 | Kale et al. |
| 5,783,017 A | 7/1998 | Boswell |
| 5,783,638 A | 7/1998 | Lai et al. |
| 5,792,549 A | 8/1998 | Wilkie |
| 5,810,957 A | 9/1998 | Boswell |
| 5,844,045 A | 12/1998 | Kolthammer et al. |
| 5,847,053 A | 12/1998 | Chum et al. |
| 5,849,419 A | 12/1998 | Josephy et al. |
| 5,852,152 A | 12/1998 | Walton et al. |
| 5,863,665 A | 1/1999 | Kale et al. |
| 5,863,834 A | 1/1999 | Kawaguchi et al. |
| 5,869,575 A | 2/1999 | Kolthammer et al. |
| 5,874,139 A | 2/1999 | Bosiers et al. |
| 5,882,749 A | 3/1999 | Jones et al. |
| 5,885,699 A | 3/1999 | Watson et al. |
| 5,885,707 A | 3/1999 | Kaschel et al. |
| 5,885,721 A | 3/1999 | Su |
| 5,897,941 A | 4/1999 | Shah |
| 5,900,294 A | 5/1999 | Murschall et al. |
| 5,900,310 A | 5/1999 | Murschall et al. |
| 5,907,942 A | 6/1999 | Eichnauer |
| 5,922,800 A | 7/1999 | Crotty et al. |
| 5,932,157 A | 8/1999 | Dries et al. |
| 5,948,199 A | 9/1999 | McGrew |
| 5,948,839 A | 9/1999 | Chatterjee |
| 5,955,205 A | 9/1999 | Ramsey et al. |
| 5,961,766 A | 10/1999 | Chang et al. |
| 5,962,092 A | 10/1999 | Kuo et al. |
| 5,972,443 A | 10/1999 | Breck et al. |
| 5,972,444 A | 10/1999 | Patel et al. |
| 5,986,009 A | 11/1999 | Thoen et al. |
| 5,986,028 A | 11/1999 | Lai et al. |
| 5,998,017 A | 12/1999 | Eichbauer et al. |
| 6,007,665 A | 12/1999 | Bourdelais et al. |
| 6,017,615 A | 1/2000 | Thakker et al. |
| 6,020,046 A | 2/2000 | Abhau |
| 6,026,953 A * | 2/2000 | Nakamura et al. .......... 206/233 |
| 6,033,514 A | 3/2000 | Davis et al. |
| 6,042,930 A | 3/2000 | Kelch et al. |
| 6,051,305 A | 4/2000 | Hsu |
| 6,060,567 A | 5/2000 | Lai et al. |
| 6,072,005 A | 6/2000 | Kobylivker et al. |
| 6,074,762 A | 6/2000 | Cretekos et al. |
| 6,083,611 A | 7/2000 | Eichbauer et al. |
| 6,093,464 A | 7/2000 | Tokunaga et al. |
| 6,093,480 A | 7/2000 | Eichbauer |
| 6,094,889 A | 8/2000 | Van Loon et al. |
| 6,096,014 A | 8/2000 | Haffner et al. |
| 6,111,023 A | 8/2000 | Chum et al. |
| 6,111,102 A | 8/2000 | Schlegel |
| 6,113,271 A * | 9/2000 | Scott ................ B65D 75/5838 206/494 |
| 6,127,043 A | 10/2000 | Lange |
| 6,136,439 A | 10/2000 | Coburn |
| 6,136,937 A | 10/2000 | Lai et al. |
| 6,140,442 A | 10/2000 | Knight et al. |
| 6,165,599 A | 12/2000 | Demeuse |
| 6,165,609 A | 12/2000 | Curatolo |
| 6,180,720 B1 | 1/2001 | Collina et al. |
| 6,183,856 B1 | 2/2001 | Amon |
| 6,194,532 B1 | 2/2001 | Maugans et al. |
| 6,197,886 B1 | 3/2001 | Chatterjee et al. |
| 6,204,330 B1 | 3/2001 | Braga et al. |
| 6,204,335 B1 | 3/2001 | Somers |
| 6,214,443 B1 | 4/2001 | Palmasi et al. |
| 6,214,447 B1 | 4/2001 | Nakagawa et al. |
| 6,214,935 B1 | 4/2001 | Sasaki et al. |

(56) References Cited

U.S. PATENT DOCUMENTS

| | | |
|---|---|---|
| 6,231,936 B1 | 5/2001 | Kozimor et al. |
| 6,231,975 B1 | 5/2001 | Kong et al. |
| 6,235,818 B1 | 5/2001 | Morizono et al. |
| 6,245,857 B1 | 6/2001 | Shamshoum et al. |
| 6,248,851 B1 | 6/2001 | Maugans et al. |
| 6,268,062 B1 | 7/2001 | Demeuse |
| 6,287,684 B1 | 9/2001 | Yamanaka et al. |
| 6,288,168 B1 | 9/2001 | Shiromoto et al. |
| 6,290,261 B1 | 9/2001 | Waggoner et al. |
| 6,299,984 B1 | 10/2001 | Forloni |
| 6,300,415 B1 | 10/2001 | Okayama et al. |
| 6,300,419 B1 | 10/2001 | Sehanobish et al. |
| 6,303,233 B1 | 10/2001 | Amon et al. |
| 6,306,518 B1 | 10/2001 | Shah et al. |
| 6,316,549 B1 | 11/2001 | Chum et al. |
| 6,319,975 B1 | 11/2001 | Lee et al. |
| 6,322,883 B1 | 11/2001 | Williams |
| 6,329,454 B1 | 12/2001 | Krabbenborg |
| 6,333,096 B1 | 12/2001 | Rodgers et al. |
| 6,340,532 B1 | 1/2002 | Huang et al. |
| 6,342,564 B1 | 1/2002 | Pitkanen et al. |
| 6,342,566 B2 | 1/2002 | Burkhardt et al. |
| 6,344,250 B1 | 2/2002 | Arthurs |
| 6,348,555 B1 | 2/2002 | Lai et al. |
| 6,362,270 B1 | 3/2002 | Chaudhary et al. |
| 6,364,988 B1 | 4/2002 | Lin |
| 6,365,682 B1 | 4/2002 | Alastalo et al. |
| 6,368,545 B1 | 4/2002 | Bailey et al. |
| 6,376,058 B1 | 4/2002 | Schut et al. |
| 6,379,605 B1 | 4/2002 | Lin |
| 6,384,123 B1 | 5/2002 | Young |
| 6,384,138 B1 | 5/2002 | Jacob et al. |
| 6,384,142 B1 | 5/2002 | Burkhardt et al. |
| 6,387,529 B1 | 5/2002 | Peet |
| 6,391,425 B1 | 5/2002 | Migliorini et al. |
| 6,410,648 B1 | 6/2002 | Sasaki et al. |
| 6,423,420 B1 | 7/2002 | Brant et al. |
| 6,436,496 B1 | 8/2002 | Rackovan et al. |
| 6,436,531 B1 | 8/2002 | Kollaja et al. |
| 6,436,534 B1 | 8/2002 | Knight et al. |
| 6,440,533 B1 | 8/2002 | Ray et al. |
| 6,441,094 B1 | 8/2002 | Cecchin et al. |
| 6,444,301 B1 | 9/2002 | Davidson |
| 6,448,355 B1 | 9/2002 | Knight et al. |
| 6,451,426 B2 | 9/2002 | Kong et al. |
| 6,455,150 B1 | 9/2002 | Sheppard |
| 6,455,171 B2 | 9/2002 | Scheibelhoffer et al. |
| 6,455,643 B1 | 9/2002 | Harlin et al. |
| 6,461,555 B1 | 10/2002 | Freedman |
| 6,461,706 B1 | 10/2002 | Freedman et al. |
| 6,469,110 B1 | 10/2002 | Harlin et al. |
| 6,472,077 B1 | 10/2002 | Cretekos et al. |
| 6,472,474 B2 | 10/2002 | Burkhardt et al. |
| 6,486,284 B1 | 11/2002 | Karande et al. |
| 6,489,019 B1 | 12/2002 | Shah et al. |
| 6,495,266 B1 | 12/2002 | Migliorini |
| 6,500,563 B1 | 12/2002 | Datta et al. |
| 6,500,901 B2 | 12/2002 | Somers et al. |
| 6,503,619 B1 | 1/2003 | Neal et al. |
| 6,503,635 B1 | 1/2003 | Kong et al. |
| 6,503,637 B1 | 1/2003 | Van Loon |
| 6,506,867 B1 | 1/2003 | Lai et al. |
| 6,511,755 B1 | 1/2003 | Mochizuki et al. |
| 6,515,093 B1 | 2/2003 | Somers |
| 6,518,377 B1 | 2/2003 | Shamshoum |
| 6,534,612 B1 | 3/2003 | Lai et al. |
| 6,548,611 B2 | 4/2003 | Lai et al. |
| 6,552,149 B2 | 4/2003 | Alastalo et al. |
| 6,566,446 B1 | 5/2003 | Parikh et al. |
| 6,566,450 B2 | 5/2003 | Debras et al. |
| 6,576,306 B2 | 6/2003 | Mehta et al. |
| 6,576,329 B2 | 6/2003 | Kong |
| 6,583,209 B2 | 6/2003 | Mehta et al. |
| 6,583,227 B2 | 6/2003 | Mehta et al. |
| 6,610,792 B2 | 8/2003 | Albe et al. |
| 6,623,866 B2 | 9/2003 | Migliorini et al. |
| 6,638,637 B2 | 10/2003 | Hager et al. |
| 6,642,290 B1 | 11/2003 | Dotson |
| 6,663,947 B2 | 12/2003 | Freedman et al. |
| 6,703,134 B1 | 3/2004 | Parr et al. |
| 6,703,447 B2 | 3/2004 | Coburn |
| 6,706,342 B2 | 3/2004 | Kong et al. |
| 6,716,501 B2 | 4/2004 | Kovalchuk et al. |
| 6,723,829 B1 | 4/2004 | Malm et al. |
| 6,734,256 B1 | 5/2004 | Everaerts et al. |
| 6,765,068 B2 | 7/2004 | Albe et al. |
| 6,780,936 B1 | 8/2004 | Agarwal et al. |
| 6,787,217 B2 | 9/2004 | Squier et al. |
| 6,790,516 B2 | 9/2004 | Niepelt |
| 6,803,421 B2 | 10/2004 | Joseph |
| 6,808,822 B2 | 10/2004 | Rajan et al. |
| 6,821,592 B2 | 11/2004 | Rodick |
| 6,828,019 B2 | 12/2004 | Kong et al. |
| 6,835,462 B2 | 12/2004 | Sun et al. |
| 6,844,079 B2 | 1/2005 | Holzer |
| 6,872,462 B2 | 3/2005 | Roberts et al. |
| 6,881,793 B2 | 4/2005 | Sheldon et al. |
| 6,887,582 B2 | 5/2005 | Lee et al. |
| 6,908,687 B2 | 6/2005 | Mendes |
| 6,919,113 B2 | 7/2005 | Therrian et al. |
| 6,919,407 B2 | 7/2005 | Tau et al. |
| 6,939,602 B2 | 9/2005 | McGee et al. |
| 6,946,535 B2 | 9/2005 | Tau et al. |
| 6,982,311 B2 | 1/2006 | Karande et al. |
| 6,991,261 B2 * | 1/2006 | Dronzek et al. ............... 283/81 |
| 6,994,915 B2 | 2/2006 | Pelliconi et al. |
| 6,995,213 B2 | 2/2006 | Miller et al. |
| 7,041,765 B2 | 5/2006 | Tau et al. |
| 7,165,888 B2 | 1/2007 | Rodick |
| 7,186,366 B2 | 3/2007 | Schwinn |
| 7,217,463 B2 | 5/2007 | Henderson |
| 7,217,767 B2 | 5/2007 | Aguirre et al. |
| 7,309,742 B2 | 12/2007 | Poncelet et al. |
| 7,410,706 B2 | 8/2008 | Rodick |
| 7,449,522 B2 | 11/2008 | Aguirre et al. |
| 7,655,317 B2 | 2/2010 | Brant et al. |
| 7,700,189 B2 | 4/2010 | Amon et al. |
| 7,722,960 B2 | 5/2010 | Mills et al. |
| 7,754,814 B2 | 7/2010 | Barcus et al. |
| 7,794,848 B2 | 9/2010 | Breese |
| 7,842,365 B2 * | 11/2010 | Riggs ............... G09F 3/0292 |
| | | 220/359.1 |
| 7,927,712 B2 | 4/2011 | Mills et al. |
| 7,951,462 B2 | 5/2011 | English et al. |
| 7,963,413 B2 | 6/2011 | Sierra-Gomez et al. |
| 8,012,558 B2 | 9/2011 | Behrens |
| 8,105,686 B2 | 1/2012 | Henderson et al. |
| 8,181,783 B2 * | 5/2012 | Kakura et al. ............... 206/494 |
| 8,182,891 B2 * | 5/2012 | Scott et al. ............... 428/40.1 |
| 8,709,610 B2 | 4/2014 | Yun et al. |
| 2001/0018125 A1 | 8/2001 | Shibuya et al. |
| 2001/0029232 A1 | 10/2001 | Eisen et al. |
| 2001/0039314 A1 | 11/2001 | Mehta et al. |
| 2001/0041776 A1 | 11/2001 | Lai et al. |
| 2001/0044506 A1 | 11/2001 | Mehta et al. |
| 2001/0051265 A1 | 12/2001 | Williams et al. |
| 2001/0055692 A1 | 12/2001 | Heffelfinger et al. |
| 2002/0006498 A1 | 1/2002 | Migliorini et al. |
| 2002/0006520 A1 | 1/2002 | Rasp et al. |
| 2002/0028340 A1 | 3/2002 | Fujii et al. |
| 2002/0037969 A1 | 3/2002 | Schut |
| 2002/0050319 A1 | 5/2002 | Nishizawa |
| 2002/0064646 A1 | 5/2002 | Cretekos et al. |
| 2002/0065384 A1 | 5/2002 | Knight et al. |
| 2002/0098303 A1 | 7/2002 | Rackovan |
| 2002/0146520 A1 | 10/2002 | Squier |
| 2002/0155283 A1 | 10/2002 | Carter et al. |
| 2002/0160170 A1 | 10/2002 | Ishige et al. |
| 2002/0182390 A1 | 12/2002 | Migliorini |
| 2002/0192466 A1 | 12/2002 | Lu |
| 2003/0008082 A1 | 1/2003 | Dronzek et al. |
| 2003/0021930 A1 | 1/2003 | Mientus |
| 2003/0049436 A1 | 3/2003 | Hager et al. |
| 2003/0049476 A1 | 3/2003 | Su |

(56) References Cited

U.S. PATENT DOCUMENTS

| | | |
|---|---|---|
| 2003/0072957 A1 | 4/2003 | Lee et al. |
| 2003/0078357 A1 | 4/2003 | Lai et al. |
| 2003/0087114 A1 | 5/2003 | Ferri et al. |
| 2003/0099792 A1 | 5/2003 | Andersson et al. |
| 2003/0113535 A1 | 6/2003 | Sun et al. |
| 2003/0114579 A1 | 6/2003 | Mori et al. |
| 2003/0134062 A1 | 7/2003 | Rajan et al. |
| 2003/0143357 A1 | 7/2003 | Frauenhofer |
| 2003/0148132 A1 | 8/2003 | Schwinn |
| 2003/0157313 A1 | 8/2003 | Shibuya et al. |
| 2003/0176603 A1 | 9/2003 | Ommundsen et al. |
| 2003/0180490 A1 | 9/2003 | Squier |
| 2003/0203230 A1 | 10/2003 | Pellingra et al. |
| 2003/0207137 A1 | 11/2003 | Kong et al. |
| 2003/0207138 A1 | 11/2003 | Kong et al. |
| 2003/0211298 A1 | 11/2003 | Migliorini |
| 2004/0013870 A1 | 1/2004 | Sheldon et al. |
| 2004/0023052 A1 | 2/2004 | Ambroise |
| 2004/0033349 A1 | 2/2004 | Henderson |
| 2004/0050479 A1 | 3/2004 | McEwen et al. |
| 2004/0072004 A1 | 4/2004 | Migliorini |
| 2004/0081776 A1 | 4/2004 | Squier |
| 2004/0110019 A1 | 6/2004 | Schubert et al. |
| 2004/0126518 A1 | 7/2004 | Mendes et al. |
| 2004/0127614 A1 | 7/2004 | Jiang |
| 2004/0197572 A1 | 10/2004 | Bell |
| 2004/0224175 A1 | 11/2004 | Henderson |
| 2005/0031824 A1 | 2/2005 | Rodick |
| 2005/0037191 A1 | 2/2005 | Ikenoya |
| 2005/0048303 A1 | 3/2005 | Henderson et al. |
| 2005/0069723 A1 | 3/2005 | Miller et al. |
| 2005/0113524 A1 | 5/2005 | Stevens |
| 2005/0129811 A1 | 6/2005 | Kraimer et al. |
| 2005/0167026 A1* | 8/2005 | Dronzek et al. ............... 156/69 |
| 2005/0214558 A1 | 9/2005 | Rodick |
| 2005/0234172 A1 | 10/2005 | Musgrave |
| 2005/0276525 A1* | 12/2005 | Hebert et al. ............... 383/203 |
| 2005/0287359 A1 | 12/2005 | Breese |
| 2006/0008666 A1 | 1/2006 | Miller et al. |
| 2006/0009586 A1 | 1/2006 | Aguirre et al. |
| 2006/0024518 A1 | 2/2006 | Kong et al. |
| 2006/0024520 A1 | 2/2006 | Kong et al. |
| 2006/0040100 A1 | 2/2006 | Nemoto et al. |
| 2006/0057410 A1 | 3/2006 | Saavedra et al. |
| 2006/0147663 A1 | 7/2006 | Barre et al. |
| 2006/0251342 A1 | 11/2006 | Forman |
| 2006/0258811 A1 | 11/2006 | Barcus et al. |
| 2006/0293424 A1 | 12/2006 | Tse |
| 2007/0059545 A1 | 3/2007 | Emiliani et al. |
| 2007/0142801 A1 | 6/2007 | Zhou |
| 2008/0020191 A1 | 1/2008 | Mussig et al. |
| 2008/0134642 A1 | 6/2008 | Brown et al. |
| 2008/0199647 A1 | 8/2008 | Blackwell |
| 2009/0068486 A1 | 3/2009 | Blackwell et al. |
| 2009/0110944 A1 | 4/2009 | Aguirre et al. |
| 2009/0130360 A1 | 5/2009 | Damman et al. |
| 2009/0155614 A1 | 6/2009 | McLeod et al. |
| 2009/0220757 A1 | 9/2009 | Patel et al. |
| 2010/0002963 A1 | 1/2010 | Holbert et al. |
| 2010/0055429 A1 | 3/2010 | Lee |
| 2010/0300616 A1 | 12/2010 | Mitchell |
| 2010/0323134 A1 | 12/2010 | Bostian et al. |
| 2011/0039151 A1 | 2/2011 | Mitchell |
| 2011/0123743 A1 | 5/2011 | Cruz et al. |
| 2011/0163100 A1* | 7/2011 | Ueda ............... B65D 75/5838 220/359.1 |
| 2011/0177326 A1 | 7/2011 | Mitchell |
| 2012/0040197 A1 | 2/2012 | Suzuki et al. |
| 2012/0060997 A1 | 3/2012 | Mitchell et al. |
| 2012/0189830 A1 | 7/2012 | Niepelt et al. |
| 2012/0196102 A1 | 8/2012 | Cortes |
| 2013/0320019 A1* | 12/2013 | Tinoco ............... B65D 17/12 220/359.2 |
| 2014/0205847 A1 | 7/2014 | Falla |
| 2014/0248480 A1 | 9/2014 | Vinck et al. |
| 2015/0151885 A1* | 6/2015 | Nakano ............... B65D 75/5838 220/266 |
| 2015/0190988 A1 | 7/2015 | Saxberg et al. |

FOREIGN PATENT DOCUMENTS

| | | |
|---|---|---|
| CN | 1720170 | 1/2006 |
| CN | 101489786 | 7/2009 |
| CN | 1533342 | 9/2009 |
| CN | 102083619 | 6/2011 |
| CN | 102137797 | 7/2011 |
| CN | 101239666 | 12/2011 |
| CN | 101239668 | 12/2011 |
| CN | 102596567 | 7/2012 |
| DE | 3710670 | 10/1987 |
| DE | 10147538 | 4/2003 |
| EP | 0185454 | 11/1980 |
| EP | 0029368 | 5/1981 |
| EP | 0122495 | 5/1989 |
| EP | 0341091 | 11/1989 |
| EP | 0377289 | 7/1990 |
| EP | 0416379 | 8/1990 |
| EP | 0119314 | 6/1991 |
| EP | 0444671 | 9/1991 |
| EP | 0619827 | 6/1993 |
| EP | 0477662 | 2/1995 |
| EP | 0688007 | 12/1995 |
| EP | 0569621 | 1/1996 |
| EP | 0373660 | 2/1996 |
| EP | 0575465 | 4/1997 |
| EP | 0608369 | 5/1997 |
| EP | 0416815 | 8/1997 |
| EP | 0457082 | 11/1997 |
| EP | 0830248 | 3/1998 |
| EP | 0677832 | 6/1998 |
| EP | 0696300 | 12/1998 |
| EP | 0887381 | 12/1998 |
| EP | 0783006 | 1/1999 |
| EP | 0640649 | 3/1999 |
| EP | 0706448 | 7/1999 |
| EP | 0950511 | 10/1999 |
| EP | 0899278 | 11/1999 |
| EP | 0899279 | 11/1999 |
| EP | 0956947 | 11/1999 |
| EP | 0589213 | 1/2000 |
| EP | 0681592 | 8/2000 |
| EP | 0472946 | 10/2000 |
| EP | 0782589 | 6/2001 |
| EP | 1116745 | 7/2001 |
| EP | 1244743 | 10/2002 |
| EP | 1283242 | 2/2003 |
| EP | 0787167 | 5/2003 |
| EP | 0831994 | 8/2003 |
| EP | 0991679 | 11/2003 |
| EP | 1044995 | 11/2003 |
| EP | 0991719 | 12/2003 |
| EP | 1376516 | 1/2004 |
| EP | 0887380 | 2/2004 |
| EP | 1409360 | 4/2004 |
| EP | 0991684 | 1/2006 |
| EP | 1719712 | 11/2006 |
| EP | 1813423 | 8/2007 |
| EP | 0863183 | 5/2008 |
| EP | 1775122 | 7/2009 |
| EP | 1886934 | 6/2010 |
| EP | 2323921 | 4/2013 |
| GB | 1171219 | 10/1968 |
| JP | 52-126487 | 4/1976 |
| JP | 52-109580 | 9/1977 |
| JP | 54-130295 | 10/1979 |
| JP | 60-178132 | 9/1985 |
| JP | 62-056117 | 3/1987 |
| JP | 62-121709 | 6/1987 |
| JP | 08-099353 | 4/1996 |
| JP | 11-198310 | 7/1999 |
| JP | 2002-037311 | 2/2002 |
| JP | 2002-370328 | 12/2002 |
| JP | 2003-137314 | 5/2003 |

(56) References Cited

FOREIGN PATENT DOCUMENTS

| | | |
|---|---|---|
| JP | 2004-114610 | 4/2004 |
| JP | 2004-182310 | 7/2004 |
| JP | 2005-281599 | 10/2005 |
| JP | 2006-326890 | 12/2006 |
| JP | 2008-063004 | 3/2008 |
| JP | 2011-526867 | 10/2010 |
| WO | 90/00788 | 1/1990 |
| WO | 9003414 | 4/1990 |
| WO | 92/06836 | 4/1992 |
| WO | 93/03093 | 2/1993 |
| WO | 93/03695 | 3/1993 |
| WO | 93/10007 | 5/1993 |
| WO | 9313143 | 7/1993 |
| WO | 9409060 | 4/1994 |
| WO | 95/01397 | 1/1995 |
| WO | 95/26268 | 10/1995 |
| WO | 95/32242 | 11/1995 |
| WO | 96/21557 | 7/1996 |
| WO | 97/01440 | 1/1997 |
| WO | 97/08235 | 3/1997 |
| WO | 98/01285 | 1/1998 |
| WO | 98/59002 | 12/1998 |
| WO | 00/13888 | 3/2000 |
| WO | 00/58090 | 10/2000 |
| WO | 01/03922 | 1/2001 |
| WO | 01/17775 | 3/2001 |
| WO | 01/46314 | 6/2001 |
| WO | 01/70484 | 9/2001 |
| WO | 02/11983 | 2/2002 |
| WO | 02/084343 | 10/2002 |
| WO | 03/011584 | 2/2003 |
| WO | 03/014219 | 2/2003 |
| WO | 03/018312 | 3/2003 |
| WO | 03/033262 | 4/2003 |
| WO | 03/093003 | 11/2003 |
| WO | 03/093004 | 11/2003 |
| WO | 03/106514 | 12/2003 |
| WO | 2004/003874 | 1/2004 |
| WO | 2004/009348 | 1/2004 |
| WO | 2004/055101 | 7/2004 |
| WO | 2004/094129 | 11/2004 |
| WO | 2005/040270 | 5/2005 |
| WO | 2005/097492 | 10/2005 |
| WO | 2006/022973 | 3/2006 |
| WO | 2006/031435 | 3/2006 |
| WO | 2006/043919 | 4/2006 |
| WO | 2006/062504 | 6/2006 |
| WO | 2007/085283 | 8/2007 |
| WO | 2007/146986 | 12/2007 |
| WO | 2007/149900 | 12/2007 |
| WO | 2008/011402 | 1/2008 |
| WO | 2010/002834 | 1/2010 |
| WO | 2010/067111 | 6/2010 |
| WO | 2011/100029 | 8/2011 |
| WO | 2011/113008 | 9/2011 |
| WO | 2011/128669 | 10/2011 |
| WO | 2012/106025 | 8/2012 |

OTHER PUBLICATIONS

International Preliminary Report on Patentability issued in corresponding IA No. PCT/CN2012/080154 dated Feb. 17, 2015.
International Search Report and Written Opinion issued in corresponding IA No. PCT/CN2012/080154 dated May 23, 2013.
European Search Report issued in corresponding EP Application No. 12 883 031.2 dated May 27, 2016.
M. Tanaka; High Value Added Film Using an Olefin Based Elastomer; Specialty Plastics Conference, Zuerich, Dec. 3-4, 1990.
Tafmer(R) "A"—A New Polyolefin Resin with Excellent Flexibility, Mitsui Petrochemical Industries, Jan. 1977 (Mitsui, 1977).
Webpage printout from www.polymersdatabase.com for LLDPE printed Jul. 29, 2003, copyright notice 2000, CRC Press, pp. 1-10 (10 pages).
NR. Dharmarajan and T.C. Yu, Modifying Polypropylene with a Metallocene Plastomer, Plastics Engineering, pp. 33-35, Aug. 1996 (3 pages).
Huntsman, product data sheet for P5M4K-046, May 2002 (1 page).
ExxonMobil Chemical, product data sheet for Exact 4151, Oct. 15, 1999 (1 page).
Webpage printout from www.polymersdatabase.com for VLDPE printed Jul. 29, 2003, copyright notice 2000, CRC Press, pp. 1-4 (4 pages).
Webpage printout from www.polymersdatabase.com for LDPE printed Jul. 29, 2003, copyright notice 2000, CRC Press, pp. 1-9 (9 pages).
Webpage printout from www.polymersdatabase.com for MDPE printed Jul. 29, 2003, copyright notice 2000, CRC Press, pp. 1-5 (5 pages).
Webpage printout from www.polymersdatabase.com for Polyethylene, High Density printed Jul. 29, 2003, copyright notice 2000, CRC Press, pp. 1-13 (13 pages).
Webpage printout from www.polymersdatabase.com for Ultra High Molecular Weight PE printed Jul. 29, 2003, copyright notice 2000, CRC Press, pp. 1-6 (6 pages).
Tamfer(R) "P"—A New-Type Elastomer as Plastics Modifying Agent Supplied in Pellet Form, Mitsui Petrochemical Industries, Aug. 1975 (Mitsui, 1975).
"MDO Films: Lots of Promise, Big Challenges," Jan H. Schut, Plastics Technology, Feb. 2005.
"Applications and Advantages of Beta-Crystalline Polypropylene," Philip Jacoby, Society of Plastics Engineers; Plastics Research Online, 10/2417/spepro.005015, 3 pages, copyright 2013.
International Search Report and Written Opinion issued in corresponding IA No. PCT/US2007/071633 dated Dec. 14, 2007.
International Preliminary Report on Patentability issued in corresponding IA No. PCT/US2007/071633 dated Jan. 8, 2009.
Kissin, Yury, Alkene Polymerization Reactions with Transition Metal Catalysts, Mar. 2008.
International Search Report and Written Opinion issued in corresponding IA No. PCT/US2015/033707 dated Aug. 6, 2015.
International Preliminary Report on Patentability issued in corresponding IA No. PCT/US2015/033707 dated Dec. 15, 2016.
International Preliminary Report on Patentability issued in corresponding IA No. PCT/US2013/024003 dated Aug. 14, 2014.
International Search Report issued in corresponding IA No. PCT/US2013/024003 dated Sep. 19, 2013.
Written Opinion mailed May 15, 2006 in corresponding International Application No. PCT/US03/20281.
International Search Report issued in corresponding IA No. PCT/US2007/071084 dated Jul. 22, 2008.
International Search Report and Written Opinion issued in corresponding IA No. PCT/US2007/071084 dated Oct. 24, 2007.

* cited by examiner

PACKAGING RECLOSURE LABEL FOR HIGH ALCOHOL CONTENT PRODUCTS

CROSS-REFERENCE TO RELATED APPLICATION

The present application claims priority to International Application No. PCT/CN2012/080154 filed Aug. 15, 2012, which is incorporated herein by reference in its entirety.

FIELD

The present subject matter relates to a layered adhesive article used as a reclosure sealing label. The layered article is advantageously used for sealing packages that contain wet product that have high alcohol content. The layered article is also used as a tamper-evident sealing label. The present subject matter also relates to packages that incorporate the layered article.

BACKGROUND

Reclosure adhesive layered articles, also known as sealing labels, are one typical adhesive functional application which requires performance characteristics that enable the sealing label to be removed and resealed to the packaging, for example, from 1 to 150 times. Typically, the number of items contained in a package correlates to the number of times reclosure is required. If a single use/serving product is provided in a package, then the resealing capabilities of a layered article may only need to provide 1 to 3 reclosures. This situation is illustrative of resealable containers for dry pasta, bread, candy, or the like. Other situations may require a greater number of reclosures, i.e. 10 to 20 reclosures or even 50 to 150 reclosures. Examples of these are travel tissue containers, frozen vegetable containers, sliced meat containers, and the like.

The adhesive used to reseal a layered article to a container must have a certain level of resistance to degradation from the product in the container. This level of resistance to the package contents must increase as the number of required reclosures increases because the adhesive is presumably in proximity to the contents for a longer period of time. This increase in product resistance of the adhesive ensures proper reclosures of the container and prevents loss of adhesion. Loss of adhesion could cause product contamination, product degradation, or exposure to environmental elements.

Of particular importance is the resealing capability of layered articles that seal containers for "wet" products. By "wet" it is meant a product that contains an amount of moisture (being water, alcohol, or other liquid medium) that may decrease the adhesion of the layered article to the container, such as wet tissue or wet wipes. Wet products are one of the most challenging applications in the reclosure market because they can reduce the bond strength of an adhesive. Good content resistance is necessary for wet sealing layered articles because normally, about 50 to about 150 reclosures are required.

Typical wet sealing labels comprise a film facestock, a reclosure adhesive, and a release liner for production and handling purposes. The above structure has adequate performance for wet products that are free of alcohol content. But for wet product with high concentrations of alcohol, this type of reclosure adhesive has poor alcohol resistance and therefore has poor resealing capabilities. The bonding strength of the typical sealing label will decrease due to alcohol corrosion to the adhesive. Furthermore, as a result of alcohol evaporation, the functional component in the content formulation of the adhesive could migrate away from the layered article and package interface.

Problems associated with typical sealing labels, as applied to high alcohol content wet product, can lead to an improper seal that fails to maintain the integrity of the packaging. Over time, an improper seal can cause degradation of the high alcohol content wet product. Degradation can include evaporation of the liquid component of the product which produces a dry item not suitable for its intended purpose.

Therefore, a need exists to have a layered article that provides proper adhesion for high alcohol content wet products.

SUMMARY

The difficulties and drawbacks associated with previously known reclosure sealing labels and strategies are overcome in the present layered article and container.

The present subject matter relates to a layered article used for sealing and re-closing packages that contain product that has high alcohol content. The layered article provides a tamper-evident feature for visual indication that the package has been initially opened. The present subject matter also relates to containers that incorporate the layered article.

In one aspect, the present subject matter provides a layered article to seal an opening in a package for a high alcohol content product. The layered article comprises a facestock, a reclosure adhesive, a machine direction oriented (hereinafter "MDO") film, and a sealing adhesive for adhering the layered article to the package and having an adhesive strength that is not significantly diminished by the product. When the layered article is initially peeled back from the package, the MDO film tears in the machine direction of the MDO film, thus forming a peeled portion of the layered article and a remaining portion of the layered article. The peeled portion of the layered article is peeled from the package and exposes the opening. The remaining portion of the layered article is retained on the package.

In another aspect, the present subject matter provides a container for a high alcohol content product. The container comprises a package having an opening, a layered article sealing the opening including a facestock, a reclosure adhesive, an MDO film, and a sealing adhesive for adhering the layered article to the package and having an adhesive strength that is not significantly diminished by the product. When the layered article is initially peeled back from the package, the MDO film tears in the machine direction of the MDO film, thus forming a peeled portion of the layered article and a remaining portion of the layered article. The peeled portion of the layered article is peeled from the package and exposes the opening and comprises the facestock, the reclosure adhesive, a peeled portion of the film, and a peeled portion of the sealing adhesive. The remaining portion of the layered article is retained on the package and comprises a remaining portion of the film and a remaining portion of the sealing adhesive.

The preferred layered article provides a good seal over an opening in a package for a high alcohol content product. The layered article has good resistance to alcohol, provides reclosure capabilities of about 50 to about 150 times, and provides strong sealing adhesion that reduces the risk of packaging blast failure during high-temperature and/or long-term transportation or storage.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

The subject matter described herein provides a layered article to seal an opening in a package for a high alcohol content product. The layered article has the capability of reclosing the package more than about 50 times and as many as about 150 times. The layered article also provides a tamper-evident feature. A related container for a high alcohol content product, incorporating the sealing layered article, is also provided.

By "alcohol" it is meant an organic compound in which the hydroxyl functional group (—OH) is bound to a carbon atom. In particular, this carbon atom should be saturated, having single bonds to three other atoms. These compounds include monohydric alcohols such as isopropyl alcohol, methanol, ethanol, propanol, butanol, and the like; polydydric alcohols such as ethylene glycol, glycerin, erythritol, zylitol, sorbitol, mannitol and the like; unsaturated aliphatic alcohols such as allyl alcohol, geraniol, propargyl alcohol and the like; and alicyclic alcohols such as inositol, menthol and the like.

By "high alcohol content product" it is meant a product containing about 5% by weight of alcohol and up to about 70% by weight of alcohol. For example, alcohol based wet tissue/wet wipes are in this category.

A preferred embodiment of the present subject matter is a layered article to seal an opening in a package for a high alcohol content wet product. The layered article comprises a facestock; a reclosure adhesive disposed on the facestock; a machine direction oriented film disposed on the reclosure adhesive, with at least one cut-out at a periphery of the film that is in line with a machine direction of the film; and a sealing adhesive disposed on the film having an adhesive strength that is not significantly diminished by the product, for adhering the layered article to the package. The layered article is such that peeling the layered article from the package causes the film to tear, beginning from the cut-outs and continuing in the machine direction of the film, thereby forming a peeled portion of the layered article and a remaining portion of the layered article. The peeled portion of the layered article is peeled from the package and exposes the opening. The remaining portion of the layered article is retained on the package. The layered article can many times re-seal the opening by releasably adhereing the peeled portion of the layered article to the remaining portion of the layered article as discussed in more detail herein.

Another preferred embodiment of the present subject matter is a container for a high alcohol content wet product. The container comprises a package, having an opening; a layered article for covering the opening, including a facestock, a reclosure adhesive disposed on the facestock, a machine direction oriented film disposed on the reclosure adhesive, with at least one cut-out at a periphery of the film that is in line with a machine direction of the film, a sealing adhesive disposed on the film having an adhesive strength that is not significantly diminished by the product, for adhering the layered article to the package. The layered article is such that peeling the layered article from the package causes the film to tear, beginning from the cut-outs and continuing in the machine direction of the film, thereby forming a peeled portion of the layered article and a remaining portion of the layered article. The peeled portion of the layered article is peeled from the package and exposes the opening and comprises the facestock, the reclosure adhesive, a peeled portion of the film, and a peeled portion of the sealing adhesive. The remaining portion of the layered article is retained on the package and comprises a remaining portion of the film and a remaining portion of the sealing adhesive. The layered article can many times re-seal the opening by releasably adhering the reclosure adhesive to the remaining portion of the film as discussed in more detail herein The layered article of present subject matter displays good resistance to alcohol and provides a strong bond to the package. The present subject matter includes a sealing adhesive and MDO film that provide a barrier to alcohol in the product. The sealing adhesive is such that its bond strength is not significantly reduced by the alcohol present in the product. The strong bond between the layered article and the package is sustained over time to maintain the integrity of the package. The maintained integrity of the package preserves the product, extends the shelf-life of the product, and minimizes the risk of packaging blast failure during high-temperature and/or long term transportation and storage. The reclosure adhesives of typical wet sealing labels degrade when exposed to alcohol and package blast failure is a normal occurrence for packages housing high alcohol content product.

The present subject matter also utilizes the MDO film to physically separate the reclosure adhesive from the high alcohol content wet product. The reclosure adhesive is thereby protected from alcohol degradation and its reclosure capabilities and bond strength is maintained.

After the initial opening of a container, the layered article will provide a good seal upon reclosure and provide reclosure capabilities of about 50 to about 150 times or more. The reclosure adhesive maintains a releasable and resealable bond because it is not subject to significant degradation by the alcohol. Alcohol evaporation from the product is thus minimized and the product remains wet and suited for its intended use. In the case of high alcohol content wet tissue, the yet unused wet tissue remaining in the container retains its alcohol content over the life-span of the product.

These and other aspects are described in greater detail herein as follows.

Layered Articles

The layered articles in accordance with the present subject matter can be used to seal openings in flexible containers such as pouches, and in rigid containers such as trays. The layered articles themselves can be flexible, rigid, or semi-rigid material or combinations thereof. Preferably, the layered articles have no scoring, perforations, or the like within their construction that would allow degradation of the product.

Figure 1:
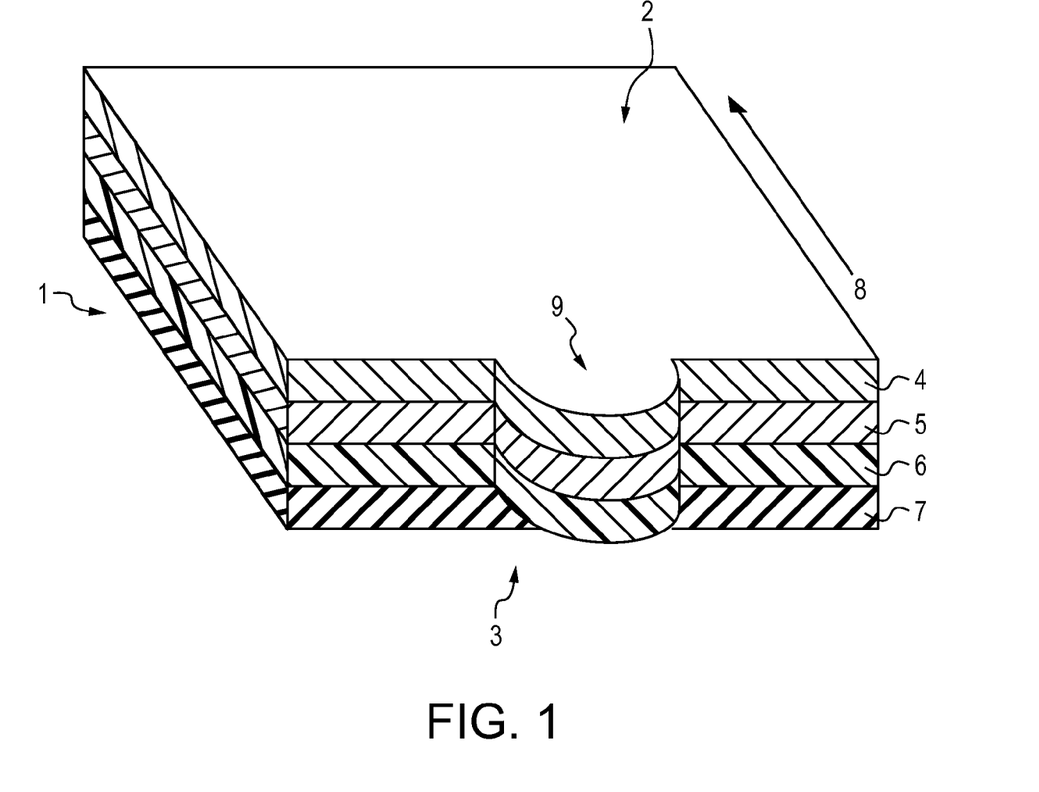
FIG. 1 is a schematic perspective view of a preferred embodiment layered article in accordance with the present subject matter.

In reference to the Figures, identically numbered features indicate similar characteristics present in each embodiment. Now looking to FIG. 1, represented is a schematic perspective view of a preferred embodiment layered article 1. It will be appreciated that the layers describe herein do not necessarily extend all the way to the edge of the layered article or that they necessarily do not extend past the edge of the layered article. For example, one or more layers can have dimensions that are smaller or larger than those of the other layers in the layered article. The layered article 1 has an exposed side 2 and a package contacting side 3. The layered article 1 comprises a facestock 4, a reclosure adhesive 5 disposed on the facestock 4, an MDO film 6, with the machine direction indicated by arrow 8, disposed on the reclosure adhesive 5, and a sealing adhesive 7 disposed on the MDO film 6. The layered article 1 has a tab 9 at a periphery of the layered article 1. The tab 9 is shown to comprise the facestock 4, the reclosure adhesive 5 and the MDO film 6. The tab 9 does not comprise the sealing adhesive 7. It will be appreciated that the tab may only comprise the MDO film 6 and not comprise the facestock 4 or reclosure adhesive 5.

Figure 2:
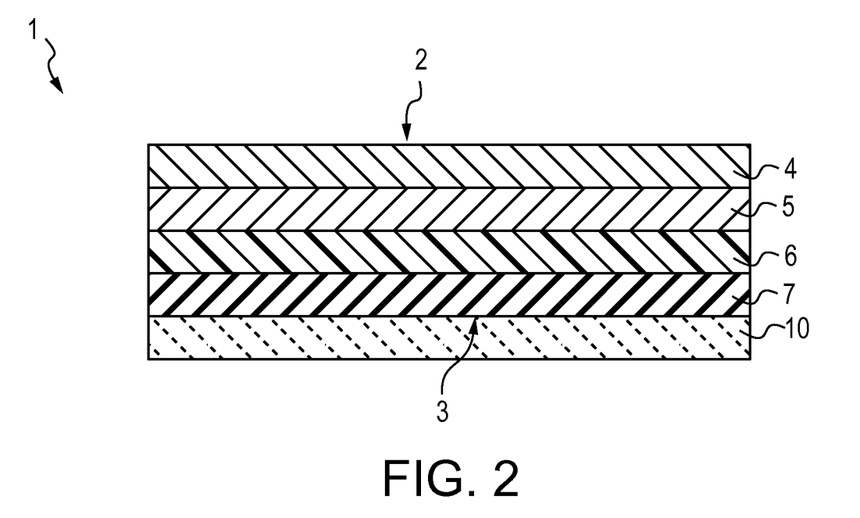
FIG. 2 is a schematic cross-sectional view of a preferred embodiment layered article in accordance with the present subject matter.
Figure 3:
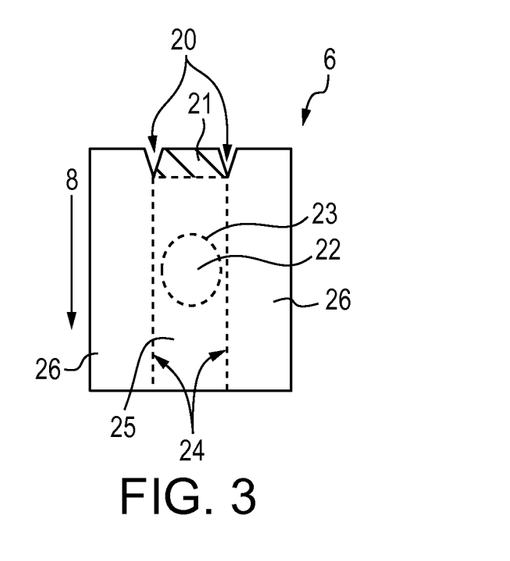
FIG. 3 is a schematic view of a preferred embodiment machine direction oriented film.
Figure 4:
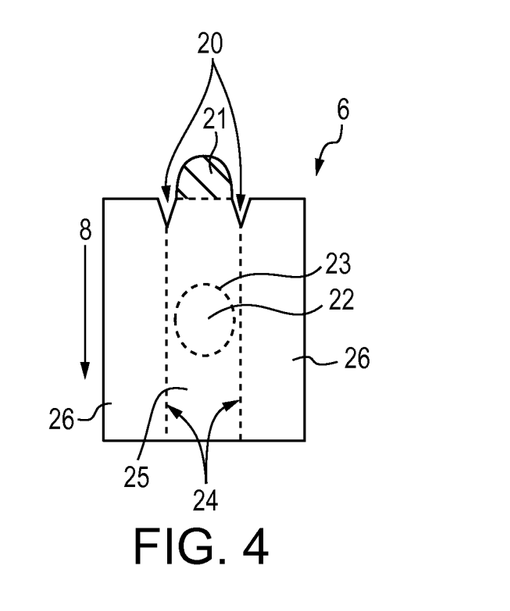
FIG. 4 is a schematic view of another preferred embodiment machine direction oriented film.
Figure 5:
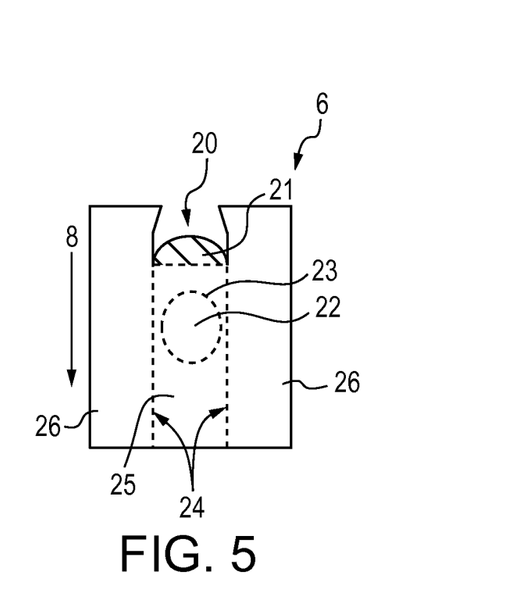
FIG. 5 is a schematic view of another preferred embodiment machine direction oriented film.
Figure 6:
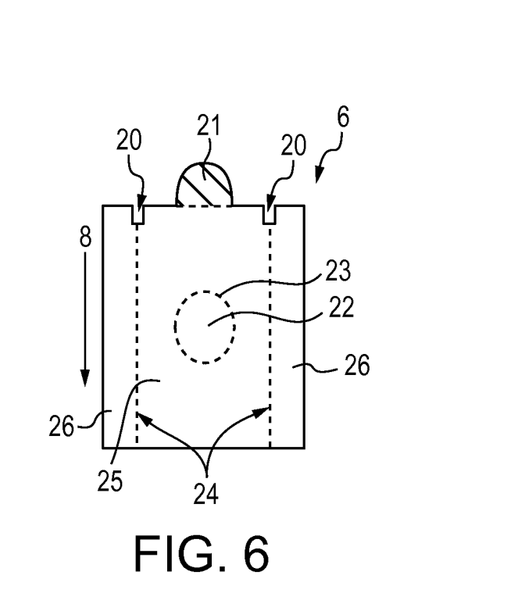
FIG. 6 is a schematic view of another preferred embodiment machine direction oriented film.

Now looking to FIG. 2, represented is a schematic cross-sectional view of a preferred embodiment layered article 1 with a release liner 10. The layered article 1 has an exposed side 2 and a package contacting side 3. The layered article 1 comprises a facestock 4, a reclosure adhesive 5 disposed on the facestock 4, an MDO film 6 disposed on the reclosure adhesive 5, and a sealing adhesive 7 disposed on the MDO film 6. The layered article 1 has a release liner 10 disposed on the sealing adhesive 7. It will be appreciated that the release liner 10 will be removed from the layered article 1 before the article is used to seal an opening in a package.

In a preferred embodiment, the layered article of the present subject matter comprises a sealing label. The sealing label is printable or has printing, images, or other indicia on or visible from the exposed side.

Facestock

In accordance with the present subject matter, the layered article comprises a facestock. The facestock of the layered article can comprise a single or multi-layered film, foil, fabric, paper, sheet, or combinations or laminations thereof, all of which are substantially two-dimensional objects having a first and second side. By substantially two-dimensional, it is meant an object having a significantly large size measurement in two dimensions compared to a significantly small size measurement in the third dimension. Alternatively, the facestock can comprise a three-dimensional object. The composition of the facestock, whether two-dimensional or three-dimensional, is not particularly limited and can comprise metal, paper, polymers, textiles, glass, ceramic, wood, or combinations thereof. Non-limiting examples of preferred facestock components are polypropylene, polyethylene, polyethylene terephthalate or combinations or blends thereof. The polymeric components of the facestock can be machine direction oriented, transverse direction oriented, or biaxially oriented.

The facestock of the present subject matter is preferably comprised of a thin polymeric elastic or flexible film formed from a pliable elastomer material. A preferred facestock comprises at least one layer that is biaxially oriented and more preferably comprises a layer of biaxially oriented polypropylene. The biaxially oriented film of the preferred facestock will be more resistant to tearing, ripping, or otherwise being damaged during peeling of the layered article from the package than a non-oriented film.

The film is continuous in that it has no perforations or pores which extend through the thickness of the film. The facestock preferably has a thickness from about 10 microns to about 100 microns, and more preferably has a thickness of about 50 microns.

The facestock can optionally include other layers or coatings for specific intended uses including printing receptive layers or coatings, hydrophobic layers or coatings, additional facestock layers, or the like. The facestock may optionally be coated on either surface.

In one aspect of the present subject matter, the facestock is at least partially transparent or translucent. That is, the facestock is not completely opaque, thus allowing underlying layers of the layered article to be observed or visible through the facestock. As will be discussed in further detail herein, when the facestock is not completely opaque, the MDO film will be observable through the facestock.

In a preferred embodiment a portion of the facestock comprises the exposed side of the layered article and can be printable or contain printing, images, or other indicia. The other side of the facestock preferably has the reclosure adhesive disposed thereon. Upon peeling the layered article from the package, the facestock preferably remains essentially intact and does not rip, tear, or otherwise become damaged.

Reclosure Adhesive

In accordance with the present subject matter, the layered article comprises a reclosure adhesive. The reclosure adhesive of the present subject matter preferably comprises a removable and resealable adhesive for resealing the layered article to the package. In one preferred aspect the reclosure layer comprises a pressure-sensitive adhesive (hereinafter "PSA"). The reclosure adhesive is preferably not completely opaque. That is, the reclosure adhesive is at least partially transparent or translucent, thus allowing underlying layers to be observable through the reclosure adhesive. As will be discussed in further detail herein, when the reclosure adhesive is not completely opaque, the MDO film will be observable through the reclosure adhesive.

Pressure-sensitive adhesives are adhesives that bond to a substrate with the application of pressure. Solvents, water, chemical reaction, or heat are not required to activate the adhesive. The degree of bonding strength is influenced by the amount of pressure which is used to apply the adhesive to the surface. Bonding strength is also affected by substrate characteristics such as smoothness, surface energy, presence of contaminants, and the like. Pressure-sensitive adhesives are usually designed for use at room temperature. They normally display a total or partial loss of bonding strength at low temperatures and shear holding ability at high temperatures.

Pressure-sensitive adhesives exhibit viscoelastic properties, which are tailored to ensure proper adhesion. Pressure-sensitive adhesives are designed to balance their tendency to flow (adhesive forces) and their resistance to flow (cohesive forces). Pressure-sensitive adhesives form a bond to a surface because their adhesive forces are such that they flow, or wet the substrate. The bond maintains strength because the cohesive forces of the pressure-sensitive adhesive are such that they resist flow when stress is applied to the bond.

Once the substrate and the pressure-sensitive adhesive are in proximity, there are also molecular interactions, such as van der Waals forces involved in the bond, which contribute significantly to the bond strength.

Pressure-sensitive adhesives are usually composed of elastomeric polymers with or without tackifiers. A variety of polymers have been used to manufacture pressure-sensitive adhesives; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like.

Pressure-sensitive adhesives are typically classified in one of two categories, permanent and removable. Permanent pressure-sensitive adhesives are adhesives which do not allow for the removal of an adhesive article from a substrate without considerable damage to the adhesive article, adhesive failure at the article surface, cohesive failure in the body of the adhesive, or residual transfer of the adhesive to the substrate.

The adhesion of removable pressure-sensitive adhesives is considerably lower, allowing removal of the adhesive article from the substrate even after a protracted period of contact. Removal is accomplished without significant damage to the adhesive article or substrate. Removable pressure-sensitive adhesives form a temporary bond and can be removed without leaving any residue on the substrate. Removable PSAs can often be removed from and resealed to a substrate multiple times without significant loss of adhesion between each resealing and removal.

A preferred embodiment for the reclosure adhesive of the present subject matter comprises a removable and resealable, acrylic based solvent pressure-sensitive adhesive that provides resealing capabilities from about 50 to about 150 times or more. An example of a preferred reclosure adhesive is SR101 provided by Avery Dennison Corporation, 150 North Orange Grove Boulevard, Pasadena, Calif. 91103-3596, USA. The SR101 adhesive is a removable acrylic based solvent pressure-sensitive adhesive featuring excellent die cutting, strip performance and UV resistance suitable for use on packages with low moisture content. Another example of a preferred reclosure adhesive is SR106 also provided by Avery Dennison Corporation. The SR106 adhesive is a removable acrylic based solvent pressure-sensitive adhesive with excellent die cutting, strip performance, and UV resistance suitable for use on packages with high moisture content. Regardless of the type of adhesive used for the reclosure adhesive, it is preferably protected from significant degradation from the alcohol in the product by the MDO film and sealing adhesive. Therefore, the reclosure adhesive does not necessarily have to be resistant to alcohol, but can be.

Other adhesives can be used; such as a polyurethane adhesive, a rubber adhesive, or the like. The adhesive layer should have a glass transition temperature less than about 10° C. below use temperature, typically less than about 30° C. below use temperature. As used herein, the phrase "use temperature" is the temperature at which the adhesive is normally bonded to a substrate. Use temperature is normally ambient (25°) but may be 0° C. or less for low temperature applications and higher than 25° C. for high temperature applications. The copolymers for the adhesive of the instant subject matter can be stabilized against UV and oxidative degradation by using UV stabilizers and antioxidants. Fillers, colorants, tackifiers, plasticizers, oils, and the like, may also be added.

Upon peeling the layered article from the package, the reclosure adhesive preferably remains essentially as a cohesive layer disposed on the facestock and does not separate, rip, tear, or otherwise become significantly damaged. The reclosure adhesive will provide a substantial portion of the resealing function for the layered article. The reclosure adhesive will remain affixed to the facestock of the layered article during each removal and resealing and separate from a portion of the MDO film as is discussed in greater detail herein.

The reclosure adhesive preferably has a thickness from about 5 microns to about 50 microns, and more preferably has a thickness from about 15 microns to about 25 microns.

The PSA layer can be disposed on one side of the facestock in a fashion suitable for a particular application. For example, the PSA can be disposed over portions of one side of the facestock or over the entire one side of the facestock. The coating of PSA disposed on the facestock can be patterned, continuous, or applied as discrete islands of adhesive. The PSA layer can have relative uniform thickness or can vary in thickness. In a preferred embodiment, the PSA is disposed in a continuous layer with relative uniform thickness on one entire side of a substantially two-dimensional facestock. In an alternative embodiment, the PSA is disposed on a portion of one side of a substantially two-dimensional facestock.

Machine Direction Oriented Film

The MDO film is preferably a substantially two-dimensional polymer film that is oriented in a machine direction having a first and second side. The MDO film is disposed on a side of the reclosure adhesive opposite the facestock.

Polymer films are typically produced using either a cast or blowing process, which produce optically cloudy films that are very flexible and conformable. After a plastic film has been formed, it can be stretched using basically two different methods—machine-direction orientation or transverse-direction orientation. By combining the above mentioned orientation processes it is also possible to produce bi-axially oriented films. Through the machine direction orientation process, the film is uni-axially oriented in the machine direction of the web. Stretching in the machine direction is normally accomplished via heated rolls that pull the film with gradually increasing speed. The film is brought to a sufficient temperature and is stretched in the machine direction. The film is then rapidly cooled to set the orientation of the film.

It is well known that orientation of plastic films enhances their properties, particularly mechanical, barrier and optical properties. The orientation process generally increases mechanical properties of the films, such as stiffness as measured by Young's modulus and tensile strength; but also improves optical properties such as clarity, haze and gloss. MDO films have good conformability due to the fact that orientation is only carried out in the machine direction. Good conformability in plastic films for label products allows labeling without wrinkles to the surface of packages, which is often significantly curved in two directions.

The orientation process may also produce a reduction of the tear resistance along the machine direction. This decrease in tear resistance along the machine direction is advantageously utilized in the present subject matter by incorporating the MDO film in the layered article such that the machine direction is in line with the direction of the peel for the layered article. Thus the peeling of the layered article from a package produces a tear along the machine direction of the MDO film. A straight clean tear is produced in the MDO film without the need for scoring, perforation, or the like. Therefore, the MDO film has no apertures, holes, or pores which extend through the thickness of the film prior to the initial opening. A continuous barrier between the high alcohol content wet product and the reclosure adhesive is provided before the initial opening of the container. The continuous barrier MDO film thereby prevents alcohol degradation of the reclosure adhesive. The MDO film preferably has a sealing adhesive disposed on a side opposite the reclosure adhesive, for bonding the layered article to the package.

The MDO film can be opaque or transparent or translucent. In one aspect, the MDO film preferably includes printing, images, or other indicia. When the facestock and reclosure adhesive are not completely opaque, the printing, images, and other indicia on the MDO film can be seen through the facestock and reclosure adhesive. When the facestock and reclosure adhesive are not totally opaque, the clean tear in the MDO film that is produced upon peeling the layered article from the package, will be seen through the facestock and reclosure adhesive. The clean tear in the MDO film being observable through the facestock and reclosure adhesive, provides visual indication that the layered article has been initially peeled from the package. Any misalignment of the printing on the MDO film will also be seen upon re-adhering the layered article to the package.

Referring now to FIGS. 3 through 6, shown are schematic views of various preferred embodiment MDO films 6. The MDO films in FIGS. 3 through 6 have one or more cut-outs 20 that are formed preferably at an edge periphery of the MDO film 6. It will be understood that the cutouts do not necessarily have to be formed at a periphery of the MDO film, but can be formed at a location inside the periphery of the film. The cut-outs 20 are in line with the machine direction 8 of the film. The cut-outs 20 do not overlap any portion of the opening 22 in an underlying package, the size and shape of the opening 22 being defined by the opening edge 23 depicted as a dotted line. Preferably, the MDO film 6 completely covers the opening 22.

The MDO film 6 has a tab part 21 that is preferably free from the sealing adhesive and at least partially comprises the tab of the layered article. The tab part 21 is preferably on the same end/side of the MDO film 6 as are the cuts-outs 20. The tab part 21 (indicated by cross-hatching lines) is free from the sealing adhesive so that the tab of the layered article does not adhere to the package. This allows the tab of the layered article to be easily grasped and pulled by a user to peel the layered article from the package to open the package. The tab part 21 is preferably in line with the machine direction 8 of the MDO film 6. The tab part 21 can be recessed (as in FIG. 5), in line (as in FIG. 3), or extending (as in FIG. 4 and FIG. 6) from the edge periphery of the MDO film 6. The edge of the tab part 21 can begin at the cut-outs 20 (as in FIGS. 3 through 5) or can begin at location(s) in between the cut-outs 20 (as in FIG. 6).

When peeled from a package by the tab part 21, the MDO film 6 tears, beginning at the one or more cut-outs 20, and extending in the machine direction 8 along tear lines 24. In conjunction with the cut-outs 20, the tab part 21 at least partially determines the location and direction of the clean tear in the MDO film 6.

The location of the clean tear in the MDO film is at least partially controlled by incorporating one or more cut-outs 20 in the MDO film. The cut-outs can be slits, voids, notches, perforations, or the like, preferably at a periphery of the MDO film and in the machine direction. Alternatively, the cut-outs 20 can begin inside the periphery of the MDO film 6. The shape of the cut-outs are not particularly limited and non-limiting examples are depicted in FIGS. 3 through 6. Preferably, the cut-outs are not overlapping any portion of the opening 22 in the package which could provide a possible means for the alcohol to leave the product. The cut-outs provide a predetermined weak point in the MDO film. The weak point provides a start for the straight clean tear in the machine direction of the film upon peeling. Peeling the layered article from the package will cause the MDO film to tear, starting at the cut-outs, and continuing in the machine direction of the film.

When peeled from the package, the MDO film tears along tear lines 24. The peeled portion 25 of the MDO film 6 between the tear lines 24 is pulled from the package with the facestock and the reclosure adhesive. When the peeled portion 25 is pulled away from the package, the sealing adhesive that bonds the peeled portion 25 to the package is also pulled away to expose the opening 22. The remaining portion 26 of the MDO film 6 on either side of tear lines 24, remains bonded to the package with the sealing adhesive, thus forming a reclosure surface to be discussed in more detail herein.

Preferably, the tear lines 24 are formed in the MDO film 6 at a position beyond the opening edge 23 of the opening 22 as shown in FIGS. 3-6. In such configurations, the sealing adhesive that is pulled away from the package with the peeled portion 25 of the MDO film 6, can reseal to the package around the periphery of the opening edge 23. The sealing adhesive, being resistant to alcohol degradation, can at least partially provide the adhesion to reseal the layered product to the package. When the sealing adhesive is able to re-adhere around the opening 22, the alcohol is further inhibited from degrading the reclosure adhesive. If the tear lines 24 were formed over the opening 22, the alcohol from the product would have an avenue to migrate to the reclosure adhesive through the torn MDO film and possibly degrade the reclosure adhesive and diminish the resealing capabilities of the reclosure adhesive.

The clean straight tear of the MDO film also provides a tamper-evident function for the layered article. When torn, the MDO film creates a visible indication that the layered article has been initially peeled from the package. When the facestock and the reclosure adhesive are not completely opaque, the clean tear is visually observed through the facestock and reclosure adhesive. It is also contemplated that the clean tear in the MDO film will be noticeable underneath the facestock and reclosure adhesive even if the facestock and reclosure adhesive are totally opaque. When the layered article is re-adhered to the package, the clean tear in the MDO film will produce a bulge, a crease, a deformation, or the like in the layered article that is visually observed even though not seen through the totally opaque facestock and reclosure adhesive.

The MDO film can also preferably includes means to prevent a complete detachment of the peeled portion of the film from the remaining portion of the film. The means are preferably at or near an end of the MDO film distal to the cut-outs and tab part. The means can be a heat seal between the MDO film and the facestock. When the facestock is biaxially oriented, the facestock will provide resistance to tearing past the heat seal. Also possible is a cut-through in the MDO film. The cut-through can be a hook design, a portion of which is substantially perpendicular to the clean tear in the MDO film, in the plane of the substantially two-dimensional MDO film. The cut-through will provide an end point for the clean tear. Also possible is a permanent adhesive to bind the MDO film to the facestock. Like the heat seal, the permanent adhesive will provide resistance to tearing in the MDO film. Other means, well known in the art can be used and these examples are not meant to be limiting to the present subject matter. When the MDO film is prevented from completely separating into two or more pieces, so too is the layered article. Thus the layered article will not separate into two or more pieces when peeled from a package to expose the opening.

Discussed herein is the use of a film, oriented in the machine direction. Also contemplated by the present subject matter is the use of transverse direction oriented film. The same objectives are accomplished by placing the tab part 21 and the one or more cut-outs 20 in line with the transverse direction of the film and incorporating a means to prevent the MDO film from separating into two or more pieces near an edge distal to the cut-outs and tab part.

Sealing Adhesive

The layered article of the present subject matter preferably includes a sealing adhesive. The sealing adhesive provides the means for bonding the layered article to the package and comprises the package contacting layer of the layered article. The sealing adhesive provides a long-term seal for a container to protect against package blast failure, reclosure adhesive degradation, reclosure adhesive migration, and the like. Thus, the alcohol content of the product and the reclosure capabilities of the reclosure adhesive are maintained. The sealing adhesive preferably is resistant to corrosion from alcohol.

The sealing adhesive is preferably a pressure-sensitive adhesive as discussed herein and more preferably, a pure acrylic based removable pressure-sensitive adhesive having a bond strength that is not significantly diminished by the high alcohol content product. By "not significantly diminished" it is meant an adhesive that, when exposed to a high alcohol content product, is able to provide a sufficient seal with the package so that the product within the container does not dry out or otherwise degrade during the life span of the product, thus keeping the product in a state suitable for its intended use.

The composition of a preferred sealing adhesive is not particularly limited except that the sealing adhesive is resistant to alcohol, i.e. has a bond strength that is not significantly diminished by alcohol from the product. In a preferred embodiment, the sealing adhesive provides a strong bond to the package that is minimally degraded by the alcohol from the wet product.

The sealing adhesive is preferably releasable and resealable. A preferred embodiment sealing adhesive maintains at least a portion of its initial bond strength after the initial opening of the package. The sealing adhesive should maintain good adhesion when resealed to the package after initial opening to avoid drying of the product.

Also contemplated by the present subject matter is an adhesive that loses a substantial portion of its bond strength after the initial opening. In this aspect, the reclosure adhesive provides the adhesion to reseal the layered article to cover the opening and prevent the product from drying.

The sealing adhesive preferably completely covers the opening. That is, the sealing adhesive extends beyond the edge of the opening when the layered article is adhered to the package.

In one embodiment, the sealing adhesive has a greater adhesive strength than the reclosure adhesive. When the reclosure adhesive provides the majority of adhesion to reseal the layered article to the package, subsequent peeling of the layered article from the package requires less force than the initial peeling of the layered article.

The sealing adhesive preferably has a thickness from about 5 microns to about 50 microns, and more preferably has a thickness from about 15 microns to about 25 microns.

As previously discussed herein, the sealing adhesive is disposed on the MDO film layer to bond the layered article to the package. Referring to previously described FIGS. 3-6, the MDO film layer tears and the peeled portion 25 of the MDO film is peeled from the package. The remaining portion 26 of the MDO film remains adhered to the package. The sealing layer that is disposed on the peeled portion 25 of the MDO film is also peeled from the package, thus exposing the opening 22. The sealing layer that is disposed on the remaining portion 26 of the MDO film remains bonded to the package. The portion of the sealing adhesive bonded to the peeled portion of the MDO film is pulled away from the package while the portion of the sealing adhesive holding down the remaining portion 26 of the MDO film 6 remains in contact with the package.

Release Liner

In a preferred embodiment of the present subject matter, the layered article has a release liner. The release liner is removed prior to applying the layered article to the package. The release liner provides protection for the sealing adhesive and prevents premature exposure of the sealing adhesive to a package, and prevents contamination by dirt, liquids, or other elemental exposure. Inadvertent contact or exposure to environmental elements can decrease the tackiness of the sealing adhesive and prevent the desired adhesion. The release liner maintains the adhesive tackiness of the sealing adhesive.

The release liner also allows for handling of the layered article prior to application to a package, i.e. during lamination, converting, packaging, printing, handling, shipping, and other manufacturing processes. The release liner may also provide stiffness to the layered article to facilitate these steps. The release liner may cover all or a portion of the sealing adhesive.

Typical materials used for the release liner in accordance with the present subject matter are super calandered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic add; ethylene methyl (meth)acrylate; ethylene butyl acrylate; polypropylene; ethylene/propylene copolymers; and impact resistant ethylene/propylene copolymers and combinations thereof.

In a preferred embodiment, the release liner comprises polyethylene terephthalate or a glassine release liner. The thickness of the release liner is not particularly limited and can range from about 5 microns to about 200 microns.

Containers

The present subject matter also includes containers for high alcohol content wet product. The containers of the present subject matter include a package and incorporate the layered article as previously described; such description being incorporated herein.

In one aspect of the present subject matter, a container for a high alcohol content product is provided. The preferred container of the present subject matter comprises a package having an opening and a layered article for sealing the opening. The layered article includes a facestock; a reclosure adhesive disposed on the facestock; a machine direction oriented film disposed on the reclosure adhesive, with at least one cut-out at a periphery of the film that is in line with the machine direction of the film; a sealing adhesive disposed on the film having an adhesive strength that is not significantly diminished by the product, for adhering the layered article to the package; and wherein initially peeling the layered article from the package causes the film to tear from said at least one cut-out, in the machine direction of the film. The tear in the MDO film forms a peeled portion of the layered article that is peeled from the package and exposes the opening, and forms a remaining portion of the layered article that is retained on the package. The peeled portion of the layered article comprises the facestock, the reclosure adhesive, a peeled portion of the film, and a peeled portion of the sealing adhesive. The remaining portion of the layered article comprises a remaining portion of the film and a remaining portion of the sealing adhesive.

The package of the preferred embodiment container is not particularly limited and can be rigid, semi-rigid, flexible, or a combination thereof. The composition of the package can comprise polymeric material, metal, paper, fabric, or combinations thereof that are either coated to enhance alcohol resistance and provide alcohol barrier properties or free of such coatings. Non-limiting examples for the composition of the preferred package are polypropylene, polyethylene (including low density, linear low density, medium density, and high density polyethylene), polyethylene terephthalate, polyester, nylon, or combinations, blends, and laminates thereof. The polymeric components of the package can be machine direction oriented, transverse direction oriented, or biaxially oriented, and can be metalized and have sealant additive and coatings. The package can be printable or comprise printing, images, or other indicia on an exposed surface.

Regardless of the form or composition chosen for the package, the preferred embodiment container ensures that the high alcohol content product housed within is properly contained prior to the initial opening, i.e. that the alcohol does not significantly escape from the container allowing the product to dry out. Proper containment of the product is provided when a suitable seal is made between the package and the layered article and when the container itself is properly sealed.

In one aspect of the present subject matter, the package is a flexible polymeric film pouch. Examples of this type of package are the flexible containers used to hold wet tissue/wet wipes usually formed from a sheet of polymeric film that has been bonded to itself with a longitudinal fin seal and two transverse end seals. Other sealing arrangements are contemplated and well known in the art.

The package of the present subject matter has an opening that is sealed by the layered article. The opening in the package can be pre-formed or created when the layered article is peeled from the package by pulling away an opening cover portion of the package. The opening cover can be formed from the package material itself and can be defined by perforations, a score line, a cut-though, bending, stamping, a three dimensional impression, or similar weakened region of the package. Alternatively, the opening cover can be distinct from the package.

Figure 7:
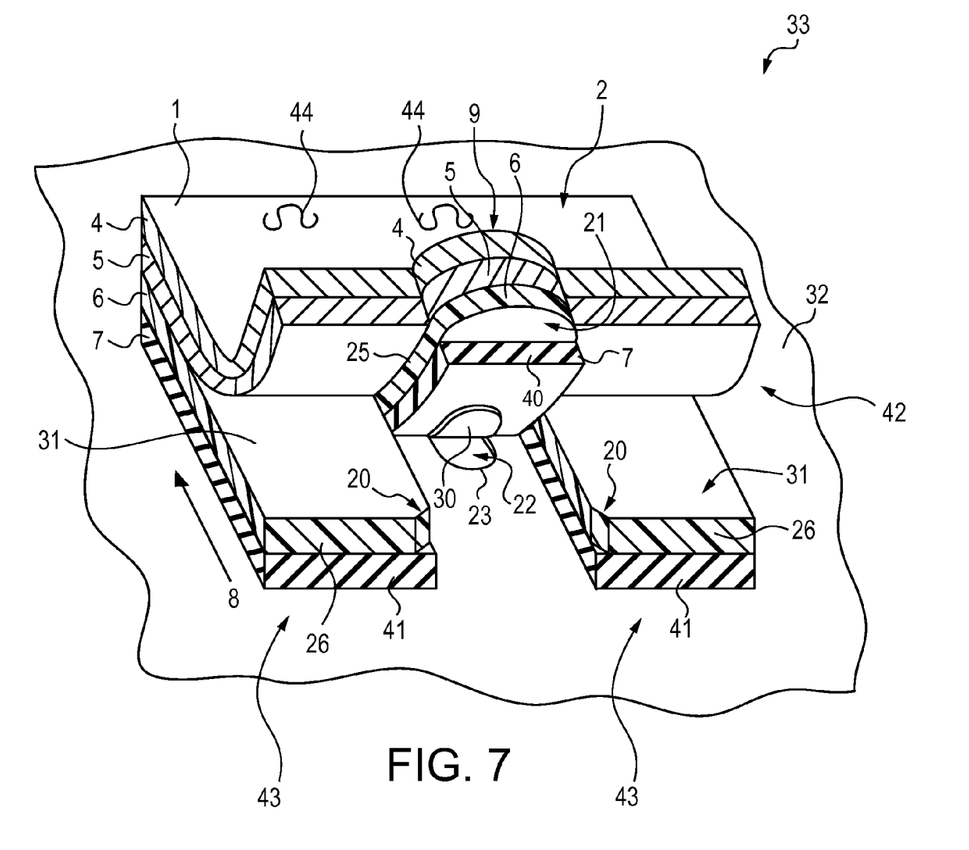
FIG. 7 is a schematic perspective view of a cut away portion of a preferred embodiment container.

FIG. 7 shows a cut-away portion of a preferred embodiment container 33. The container 33 comprises a package 32 with a layered article 1 adhered thereto for sealing an opening 22 in the package 32. The layered article 1 is shown to be partially peeled from the container 33. The layered article 1, has an exposed side 2. The layered article 1 comprises a facestock 4; a reclosure adhesive 5 disposed on the facestock 4; an MDO film 6 disposed on the reclosure adhesive 5, with the machine direction of the film 6 indicated by arrow 8; and a sealing adhesive 7 disposed on the MDO film 6, for adhering the layered article 1 to the package 32. The layered article 1 has a tab 9, at a periphery of the layered article 1, that is shown to comprise the facestock 4, the reclosure adhesive 5 and the MDO film 6. It is contemplated that in certain versions the tab 9, only comprises the MDO film 6. The tab 9 more specifically comprises a tab part 21 of the MDO film 6 that does not have the sealing adhesive 7 disposed thereon. Accordingly, the tab 9 does not comprise the sealing adhesive 7.

When the layered article 1 is peeled from the package 32 by use of the tab 9, the MDO film 6 tears. The tear begins at two cut-outs 20 on either side of the tab part 21, and continues in the machine direction 8 of the MDO film 6. The tear forms a peeled portion 42 of the layered article 1 and a remaining portion 43 of the layered article 1. The peeled portion 42 is peeled from the package 32 and exposes the opening 22. The remaining portion 43 is retained on the package.

The peeled portion 42 of the layered article 1 comprises the facestock 4, the reclosure adhesive 5, a peeled portion 25 of the MDO film 6, and a peeled portion 40 of the sealing adhesive 7. The peeled portion 40 of the sealing adhesive 7 is shown partially revealing the opening 22 in the package 32 that is defined by an opening edge 23. The peeled portion 40 of the sealing adhesive 7 and the peeled portion 26 of the MDO film 6 cover opening 22 and extend beyond the opening edge 23 of the opening 22. The opening 22 is shown to be formed in the package 32 as the peeled portion 40 of the sealing adhesive 7 pulls away an opening cover 30 from the package 32. The opening cover 30 is shown to be formed from the package 32 material.

The remaining portion 43 of the layered article 1 remains bonded to the package and comprises a remaining portion 26 of the MDO film 6 and a remaining portion 41 of the sealing adhesive 7. The remaining portion 26 of the MDO film has a reclosure surface 31 to which the reclosure adhesive 5 can bond to reseal the opening 22 in the container 33. In a preferred embodiment, the reclosure adhesive 5, along with the peeled portion 40 of the sealing adhesive 7 combine to provide adhesion to reseal the opening 22 in the container 33.

The peeled portion 42 of the layered article 1 is prevented from completely detaching or separating from the remaining portion 43 of the layered article 1 by means of heat seals 44 fashioned in a hook design, that are in line with the tear in the MDO film 6.

As discussed previously herein, the clean straight tear of the MDO film 6 also provides a tamper-evident function for the layered article 1. When the facestock 4 and reclosure adhesive 5 are not totally opaque, the tear in the MDO film is visible through the facestock 6 and reclosure adhesive 5. Other tamper-evident features can optionally be incorporated into the layered article 1, package 32, or container 33.

The container and layered article of the present subject matter provide a good initial seal for high alcohol content wet product that is resistant to alcohol degradation and reduces the likelihood of package blast failure. The container and layered article also provide good resealing capabilities and reduce the likelihood of the product drying out during the lifespan of the product.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A layered article to seal an opening in a package for a high alcohol content product comprising:
   a facestock,
   a reclosure adhesive disposed on the facestock,
   a machine direction oriented film disposed on the reclosure adhesive, with at least one cut-out at a periphery of the film that is in line with a machine direction of the film,
   a sealing adhesive disposed on the film and having an adhesive strength that is not significantly diminished by the product, for adhering the layered article to the package;
   wherein an initial peeling of the layered article from the package causes the film to tear from said at least one cut-out, in the machine direction of the film, forming a peeled portion of the layered article that is peeled from the package and exposes the opening, and forming a remaining portion of the layered article that is retained on the package, and
   wherein the machine direction oriented film has a reclosure surface, in the remaining portion of the layered article, to which the reclosure adhesive is adapted to bond to reseal the opening.

2. The layered article of claim 1 wherein the peeled portion of the layered article comprises the facestock, the reclosure adhesive, a peeled portion of the film, and a peeled portion of the sealing adhesive.

3. The layered article of claim 2 wherein the remaining portion of the layered article comprises a remaining portion of the film and a remaining portion of the sealing adhesive.

4. The layered article of claim 3 wherein subsequent to the initial peeling, the peeled portion of the layered article is capable of re-sealing the opening by releasably adhering the reclosure adhesive to the remaining portion of the film.

5. The layered article of claim 4 wherein the reclosure adhesive is capable of re-sealing the opening from 50 times to 150 times.

6. The layered article of claim 3 further comprising means to prevent a complete detachment of the peeled portion of the layered article from the remaining portion of the layered article upon peeling the layered article from the package.

7. The layered article of claim 3 wherein the tear in the film provides a visual indication of the initial peeling.

8. The layered article of claim 7 wherein the facestock is not completely opaque so that the visual indication of the initial peeling is observable through the facestock.

9. The layered article of claim 3 further comprising a tab at a periphery of the layered article, for grasping and peeling the layered article, the tab comprising a portion of the film that does not have the sealing adhesive disposed thereon.

10. The layered article of claim 9 wherein an edge of the tab begins at said at least one cut-out.

11. The layered article of claim 9 wherein the tab extends from the periphery of the layered article.

12. The layered article of claim 9 wherein the tab further comprises a portion of the facestock and a portion of the reclosure adhesive.

13. The layered article of claim 3 wherein the facestock has one or more layers selected from the group consisting of a polyolefin, polyethylene terephthalate, polyvinyl chloride or combinations thereof.

14. The layered article of claim 13 wherein said one or more layers of the facestock is biaxially oriented.

15. The layered article of claim 3 wherein the film comprises one or more polyolefins.

16. The layered article of claim 4 wherein the reclosure adhesive comprises a pressure-sensitive acrylic based solvent adhesive.

17. The layered article of claim 3 wherein the sealing adhesive comprises an acrylic based adhesive and has a greater adhesive strength than the reclosure adhesive.

18. The layered article of claim 3 further comprising printing, images, or other indicia on the film that is observable through the facestock.

19. The layered article of claim 3 further comprising printing, images, or other indicia on an exposed portion of the facestock.

20. The layered article of claim 3 further comprising a release liner disposed on the sealing adhesive.

21. A container for a high alcohol content product comprising:
   a package, having an opening;
   a layered article sealing the opening comprising
      a facestock,
      a reclosure adhesive disposed on the facestock,
      a machine direction oriented film disposed on the reclosure adhesive, with at least one cut-out at a periphery of the film that is in line with a machine direction of the film,
      a sealing adhesive disposed on the film, having an adhesive strength that is not significantly diminished by the product, for adhering the layered article to the package; and
   wherein initially peeling the layered article from the package causes the film to tear from said at least one cut-out, in the machine direction of the film, forming
      a peeled portion of the layered article that is peeled from the package and exposes the opening, the peeled portion of the layered article comprising the facestock, the reclosure adhesive, a peeled portion of the film, and a peeled portion of the sealing adhesive, and
      a remaining portion of the layered article that is retained on the package, the remaining portion of the layered article comprising a remaining portion of the film and a remaining portion of the sealing adhesive and
   wherein the machine direction oriented film has a reclosure surface, in the remaining portion of the layered article, to which the reclosure adhesive is adapted to bond to release the opening.

22. The container of claim 21 wherein the sealing adhesive and film completely cover the opening.

23. The container of claim 21 wherein the package comprises a flexible polymeric pouch comprising one or more film layers.

24. The container of claim 21 wherein subsequent to initially peeling the layered article from the package, the peeled portion of the layered article is capable of re-sealing the opening by releasably adhering the reclosure adhesive to the remaining portion of the film.

25. The container of claim 24 wherein the reclosure adhesive is capable of re-sealing the opening from 50 times to 150 times.

26. The container of claim 21 further comprising means to prevent a complete detachment of the peeled portion of the layered article from the remaining portion of the layered article upon peeling the layered article from the package.

27. The container of claim 21 wherein the tear in the film provides a visual indication that the layered article has been initially peeled from the package.

28. The container of claim 21 wherein the facestock is not completely opaque so that the visual indication is observable through the facestock.

29. The container of claim 21 wherein the layered article further comprises a tab at a periphery of the layered article, for grasping and peeling the layered article from the package, the tab comprising a portion of the film that does not have the sealing adhesive disposed thereon.

30. The container of claim 29 wherein an edge of the tab begins at said at least one cut-out.

31. The container of claim 29 wherein the tab extends from the periphery of the layered article.

32. The container of claim 29 wherein the tab further comprises a portion of the facestock and a portion of the reclosure adhesive.

33. The container of claim 21 wherein the facestock has one or more layers selected from the group consisting of a polyolefin, polyethylene terephthalate, polyvinyl chloride or combinations thereof.

34. The container of claim 33 wherein said one or more layers of the facestock is biaxially oriented.

35. The container of claim 24 wherein the reclosure adhesive comprises a pressure-sensitive acrylic based solvent adhesive.

36. The container of claim 21 wherein the film comprises one or more polyolefins.

37. The container of claim 21 wherein the sealing adhesive comprises a pressure-sensitive adhesive that is releaseable and resealable.

38. The container of claim 37 wherein the sealing adhesive comprises an acrylic based adhesive and has a greater adhesive strength than the reclosure adhesive.

39. The container of claim 21 further comprising printing, images, or other indicia on the film that is observable through the facestock.

40. The container of claim 21 further comprising printing, images, or other indicia on an exposed portion of the facestock.

41. A container for a high alcohol content product comprising:
   a package, having an opening cover defined by one or more weakened regions,
   a layered article, adhered to the package over the opening cover, comprising
      a facestock,
      a reclosure adhesive disposed on the facestock,
      a machine direction oriented film disposed on the reclosure adhesive, with at least one cut-out at a periphery of the film that is in line with a machine direction of the film,
      a sealing adhesive disposed on the film, having an adhesive strength that is not significantly diminished by the product, for adhering the layered article to the package; and
   wherein initially peeling the layered article from the package causes the film to tear from said at least one cut-out, in the machine direction of the film, forming
      a peeled portion of the layered article that is peeled from the package, the peeled portion of the layered article comprising the facestock, the reclosure adhesive, a peeled portion of the film, and a peeled portion of the sealing adhesive, the peeled portion of the sealing adhesive at least partially separates the opening cover from the package to thereby form an opening in the package, and
      a remaining portion of the layered article that is retained on the package, the remaining portion of the layered article comprising a remaining portion of the film and a remaining portion of the sealing adhesive and
   wherein the machine direction oriented film has a reclosure surface, in the remaining portion of the layered article, to which the reclosure adhesive is adapted to bond to reseal the opening.

* * * * *